(12) United States Patent
Nakamura

(10) Patent No.: US 8,330,835 B2
(45) Date of Patent: Dec. 11, 2012

(54) IMAGE CAPTURING APPARATUS

(75) Inventor: Tsuyoshi Nakamura, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/141,458

(22) PCT Filed: Sep. 29, 2010

(86) PCT No.: PCT/JP2010/005866
§ 371 (c)(1),
(2), (4) Date: Jun. 22, 2011

(87) PCT Pub. No.: WO2011/055483
PCT Pub. Date: May 12, 2011

(65) Prior Publication Data
US 2012/0206629 A1 Aug. 16, 2012

(30) Foreign Application Priority Data

Nov. 6, 2009 (JP) ................. 2009-255201

(51) Int. Cl.
*H04N 5/217* (2006.01)
*H04N 5/335* (2006.01)
(52) U.S. Cl. ........................ 348/241; 348/302
(58) Field of Classification Search ............... 348/241, 348/243, 248, 281, 294, 302
See application file for complete search history.

(56) References Cited

U.S. PATENT DOCUMENTS 7,999,866 B2 * 8/2011 Sonoda et al. ............. 348/245
8,026,961 B2 * 9/2011 Takenaka et al. .......... 348/241
2004/0252206 A1 12/2004 Tsumura et al.

(Continued)

FOREIGN PATENT DOCUMENTS

JP 2004-356034 12/2004

(Continued)

OTHER PUBLICATIONS

International Search Report issued Oct. 26, 2010 in corresponding International Application No. PCT/JP2010/005866.

(Continued)

*Primary Examiner* — Trung Diep
(74) *Attorney, Agent, or Firm* — Wenderoth, Lind & Ponack, L.L.P.

(57) ABSTRACT

An image capturing apparatus includes: an image pickup section for converting, into image data, pixel signals obtained by picking up an image of an object; and an image processing section for performing predetermined image processing on the image data obtained as a result of conversion by the image pickup section. The image pickup section includes: an X-Y addressable image sensor for accumulating, in an image pickup area thereof, pixel signals of an object obtained by image pickup; and a conversion means for sequentially reading out pixel signals contained in each of processing units, converting the pixel signals into image data, and outputting the image data, the processing units each being an area of a predetermined size defined by dividing the image pickup area of the image sensor into rectangular blocks of a predetermined size and adding a predetermined number of pixels to each rectangular block in vertical and horizontal directions of the rectangular block. The image processing section includes: a memory for sequentially receiving and storing image data of each processing unit; and an image processing means for sequentially performing the predetermined image processing on the image data stored in the memory that is contained in the range of the rectangular block, and outputting the resultant image data.

5 Claims, 13 Drawing Sheets

U.S. PATENT DOCUMENTS

| | | |
|---|---|---|
| 2005/0068431 A1* | 3/2005 | Mori .................... 348/241 |
| 2006/0146167 A1 | 7/2006 | Aizawa et al. |
| 2008/0259178 A1 | 10/2008 | Oike |
| 2008/0291296 A1 | 11/2008 | Oike |

FOREIGN PATENT DOCUMENTS

| | | |
|---|---|---|
| JP | 2005-6061 | 1/2005 |
| JP | 2006-166144 | 6/2006 |
| JP | 2006-191302 | 7/2006 |
| JP | 2008-271279 | 11/2008 |
| JP | 2008-294698 | 12/2008 |

OTHER PUBLICATIONS

Yonemoto Kazuya, "Kiso to Oyo (Basic and Application) of CCD/CMOS image sensors", CQ Publishing Co., Ltd., Aug. 2003, pp. 119-120 (with partial English translation).

* cited by examiner

F I G. 2
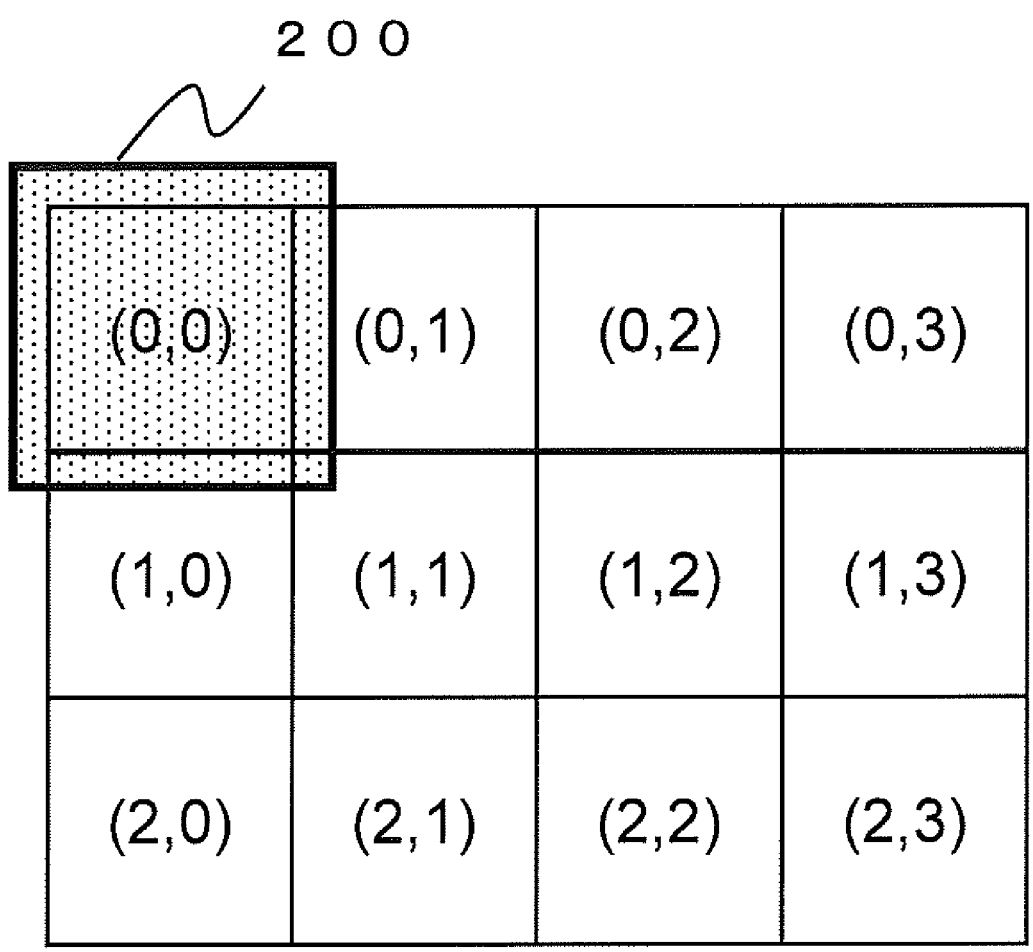

F I G. 9
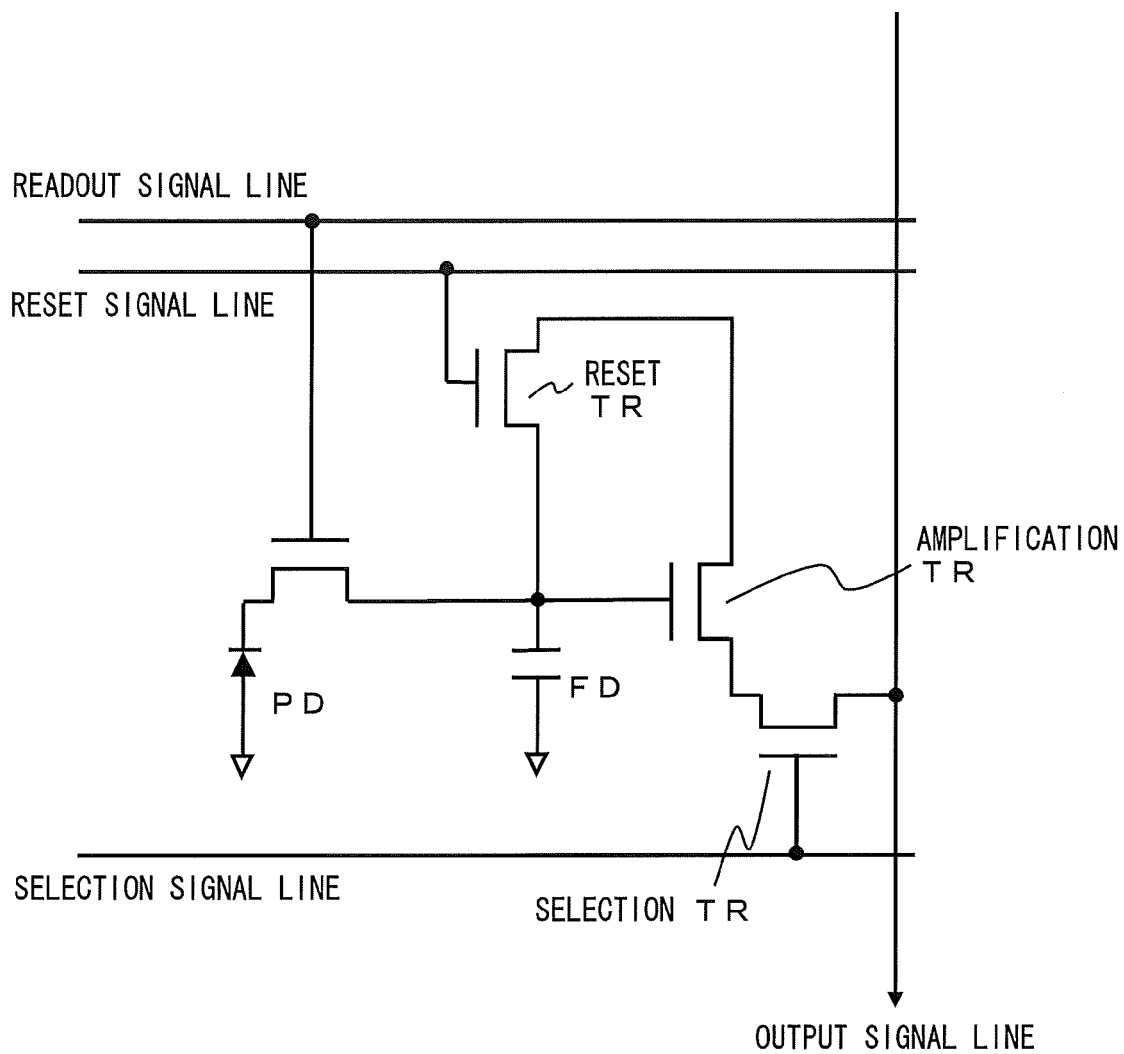

F I G. 1 1
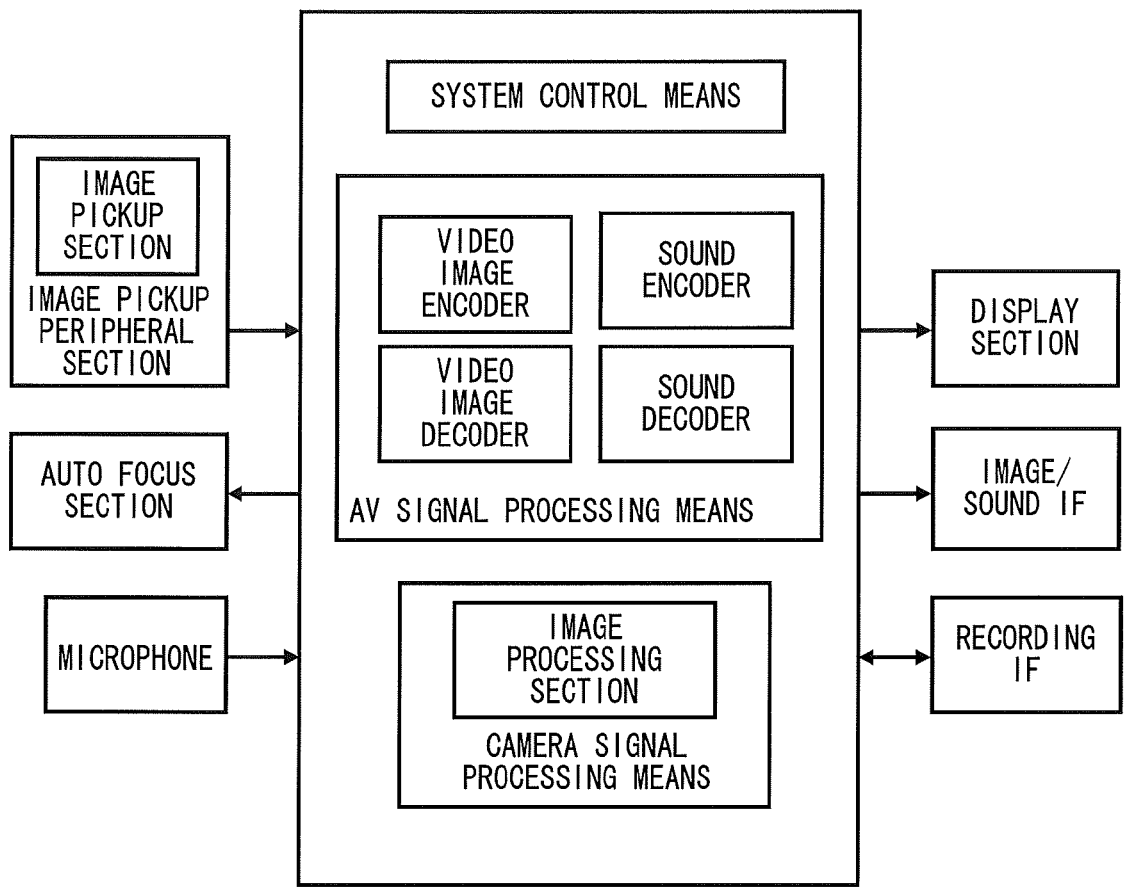

IMAGE CAPTURING APPARATUS

TECHNICAL FIELD

The present invention relates to image capturing apparatuses, and particularly to reduction in power consumption and memory capacity for image data processing in image capturing apparatuses.

BACKGROUND ART

In a digital camera system, pixel signals obtained by an image sensor are converted into image data which is digital data. The image data is temporarily stored in a memory, and then image processing is performed thereon.

As the resolution of a digital camera system is enhanced and the number of pixels of an image sensor mounted in the digital camera system is increased, the amount of image data increases correspondingly, and thus the memory capacity required for temporarily storing image data also increases. In addition, since a large amount of image data is read and written, a large bandwidth needs to be secured for memory access. However, increasing memory capacity and bandwidth leads to rise in power consumption and cost.

Examples of a conventional technique for reducing memory capacity include an image processing apparatus disclosed in Patent Literature 1. The configuration of an image processing apparatus 1400 disclosed in Patent Literature 1 is shown in (a) of FIG. 12. An image pickup device 1413 performs image pickup, an A/D converter 1414 digitally converts pixel signals accumulated in the image pickup device 1413, and then an amplification means 1415 amplifies the digitally-converted pixel signals to generate digital image data. As shown in FIG. 13, the digital image data is divided into a plurality of rectangular blocks each having a predetermined size. Digital image data of each rectangular block is compression-encoded with a fixed amount of code, and is stored in a memory 1416. By compressing the amount of data in this manner, reduction in memory capacity is achieved.

CITATION LIST

[Patent Literature]
 [PTL 1] Japanese Laid-Open Patent Publication No. 2006-166144
[Non Patent Literature]
 [NPL 1] "Kiso to Oyo (Basic and Application) of CCD/CMOS image sensors" by Yonemoto Kazuya, CQ Publishing Co., Ltd., pp.119-pp.120, August, 2003

SUMMARY OF THE INVENTION

Problems to be Solved by the Invention

Although the image processing apparatus of Patent Literature 1 allows reduction in memory capacity that is required for sequentially receiving and holding image data outputted from the image pickup section, the image processing apparatus has a problem in that a large memory capacity or a large memory bandwidth is needed in order to subsequently perform image processing such as a filter operation. The conventional problem will be described below by means of an example of image processing in which a 3×3 filter operation is performed on image data. The 3×3 filter operation is processing for correcting target pixel data by using pixel data contained in a 3×3 area having a center at the target pixel. This processing is performed targeting each pixel in the area subjected to the image processing, and then the image processing is completed.

When a target pixel is located at the boundary between rectangular blocks, the 3×3 area contains pixels belonging to a plurality of blocks. This will be described with reference to FIG. 13. Image data in FIG. 13 is divided into 3×4 rectangular blocks (0, 0) to (2, 3). Here, for example, consideration will be given to the case where pixel data 1301, which is located at the lower right boundary of the rectangular block (0, 0), is targeted as a central pixel of the 3×3 filter. In this case, the area used for the 3×3 filter operation is a 3×3 filter area 1300. It is understood that the 3×3 filter area 1300 contains pixels belonging to the four rectangular blocks (0, 0), (0, 1), (1, 0), and (1, 1).

Accordingly, when the 3×3 filter operation in which the pixel data 1301 is targeted as a central pixel is performed, the pixel data of the four rectangular blocks is required. For this reason, it is necessary to expand and hold, on the memory at the same time, each image data which has been compressed for each of the four rectangular blocks, or it is necessary to expand and hold the required part of the image data on the memory in accordance with the processing. Therefore, a large memory capacity or a large bandwidth for memory access has to be secured. This results in increase in cost and power consumption.

Such a problem occurs also when it is attempted to perform, in a pipelined manner, image processing such as a filter operation on image data outputted from an image pickup section. For example, consideration will be given to the case where pixel data is read out in the order of the rectangular blocks (0, 0), (0, 1), (0, 2), (0, 3), (1, 0), (1, 1), . . . , which are shown in FIG. 13, and image processing is performed for the rectangular blocks in the same order. The pixel data of the sixth rectangular block (1, 1) is required for performing filter operation processing for the first rectangular block (0, 0). Therefore, until the pixel data of the sixth rectangular block (1, 1) is read out, the filter operation processing for the first rectangular block (0, 0) is not completed. In this case, a large memory capacity or a large bandwidth for memory access is needed to hold the pixel data and the filter operation results of the six rectangular blocks indicated by an area 1302. Such a problem occurs not only in cases where a 3×3 filter operation is performed but also in general cases where image processing is performed using pixel data of a plurality of rectangular blocks adjacent to one another. An example of the configuration of a conventional image processing apparatus that performs such image processing is shown in (b) of FIG. 12. An image processing apparatus 1500 further includes an image processing means 1417, and a bus 1418 for connecting the image processing means and a memory, in addition to the components of the conventional image processing apparatus 1400. Due to the above problem, the capacity of the memory 1416 or the bandwidth of the bus 1418 needs to be large.

As described above, the conventional image processing apparatuses have limitations in reducing the memory capacity and memory bandwidth which are required for performing image processing such as a filter operation on image data outputted from the image pickup section. Accordingly, it is difficult to reduce cost and power consumption.

Therefore, an object of the present invention is to reduce required memory capacity or memory bandwidth, thereby achieving reduction in cost and power consumption, in an image capturing apparatus which receives image data outputted from an image pickup section and performs image processing such as a filter operation.

Solution to the Problems

In order to solve the conventional problems, a first aspect of the present invention is an image capturing apparatus for picking up an image of an object and outputting image data of the object, the image capturing apparatus including: an image pickup section for picking up an image of an object and converting, into image data, pixel signals obtained by the image pickup; and an image processing section for performing at least one type of predetermined image processing on the image data obtained as a result of conversion by the image pickup section. The image pickup section includes: an X-Y addressable image sensor for accumulating, in an image pickup area thereof, pixel signals of an object obtained by image pickup; and a conversion means for sequentially reading out pixel signals contained in each of processing units, converting the pixel signals into image data, and outputting the image data, the processing units each being an area of a predetermined size defined by dividing the image pickup area of the image sensor into rectangular blocks of a predetermined size and adding a predetermined number of pixels to each rectangular block in vertical and horizontal directions of the rectangular block. The image processing section includes: at least one memory for sequentially receiving and storing image data of each processing unit; and at least one image processing means for sequentially performing the predetermined image processing on the image data stored in the memory that is contained in the range of the rectangular block, and outputting the resultant image data.

A second aspect of the present invention is an image capturing apparatus based on the first aspect, in which the image processing section includes a plurality of memories and a plurality of image processing means each of which performs a different type of predetermined image processing, the plurality of memories and the plurality of image processing means being alternately connected to each other, and the image processing section sequentially performs the different types of the predetermined image processing.

Further, a third aspect of the present invention is an image capturing apparatus based on any one of the first and second aspects, the image capturing apparatus further including a noise reduction section for sequentially receiving the image data outputted from the conversion means, performing different types of noise reduction processing having different characteristics, and outputting the resultant image data, one type of which noise reduction processing is performed on a part of the image data corresponding to pixel signals that have been read out for the first time after image pickup by the image sensor, and another type of which is performed on a part of the image data corresponding to pixel signals that have been read out for the second and subsequent times after image pickup by the image sensor. The image processing section receives the image data having been subjected to the noise reduction processing.

Still further, other aspects of the present invention include an integrated circuit having integrated a part or all of the functions of an image capturing apparatus as described above, a method for realizing the functions of an image capturing apparatus as described above, and a digital camera system comprising an image capturing apparatus as described above.

Advantageous Effects of the Invention

According to the present invention, in an image capturing apparatus which receives image data outputted from an image pickup section and performs image processing such as a filter operation, required memory capacity or memory bandwidth can be reduced, and thus cost and power consumption can be reduced.

BRIEF DESCRIPTION OF THE DRAWINGS

FIG. 1 is a diagram showing an image capturing apparatus according to embodiment 1 of the present invention.

[FIG. 2] FIG. 2 is a diagram showing a readout block according to embodiment 1 of the present invention.

FIG. 3 is a diagram showing overlapping of a readout block according to embodiment 1 of the present invention.

FIG. 4 is a diagram showing a processing flow according to embodiment 1 of the present invention.

FIG. 5 is a diagram showing an image capturing apparatus according to embodiment 2 of the present invention.

FIG. 6 is a diagram showing a flow of noise reduction characteristics control according to embodiment 2 of the present invention.

FIG. 7 is a diagram for illustrating the switching of the characteristics of noise removal according to embodiment 2 of the present invention.

FIG. 8 is a diagram showing a processing flow according to embodiment 2 of the present invention.

[FIG. 9] FIG. 9 is a diagram showing the configuration of a CMOS image sensor.

FIG. 10 is a diagram showing an example of the configuration of an integrated circuit according to the present invention.

[FIG. 11] FIG. 11 is a diagram showing an example of the configuration of a digital camera system according to the present invention.

FIG. 13 is a diagram for illustrating readout for rectangular blocks in a conventional technique.

DESCRIPTION OF EMBODIMENTS

Embodiments of the present invention will be described with reference to the drawings.

(Embodiment 1)

Figure 1:
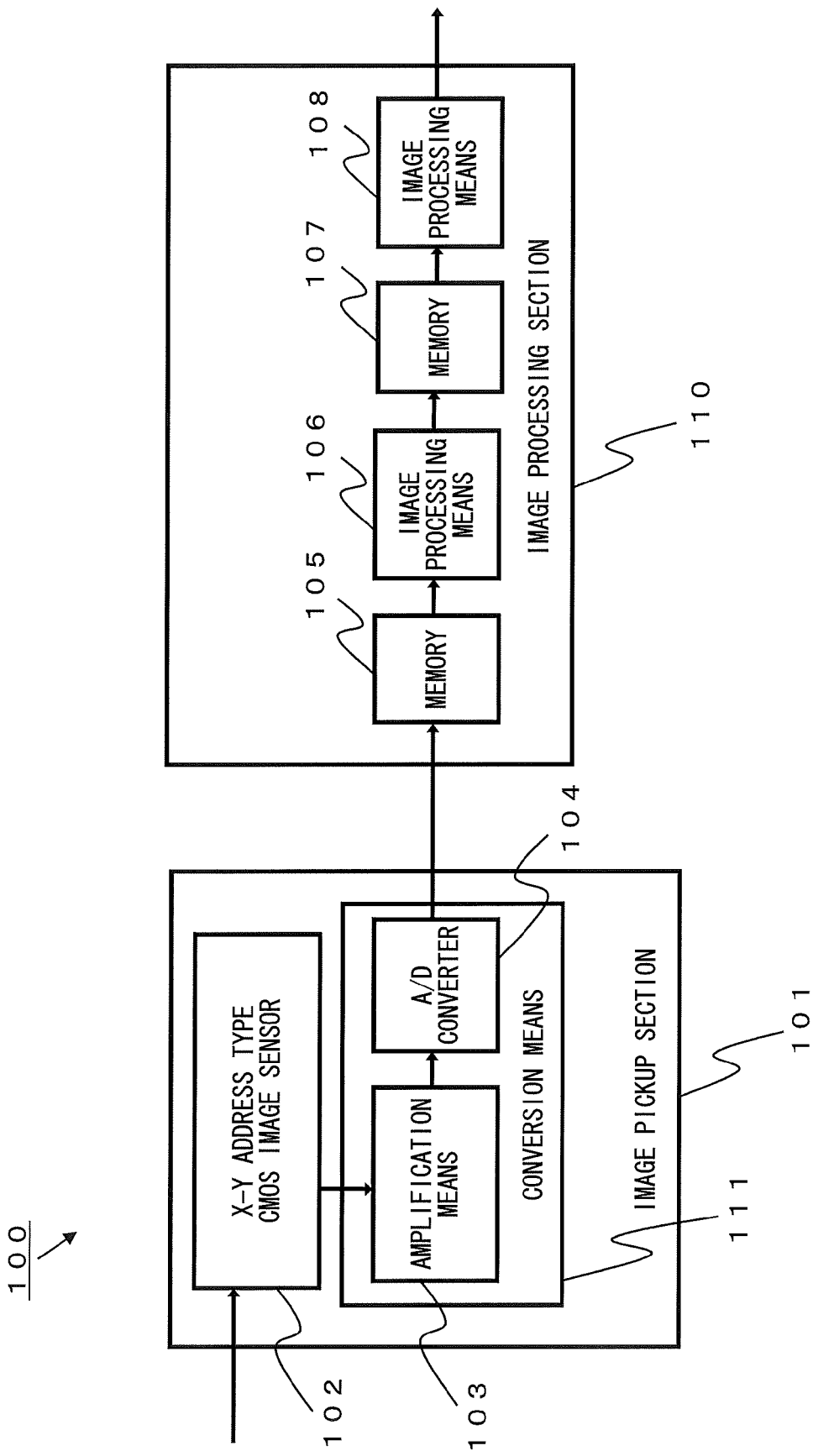
[FIG. 1]

FIG. 1 is a diagram showing an image capturing apparatus according to embodiment 1 of the present invention. An image capturing apparatus 100 includes an image pickup section 101 and an image processing section 110. The image pickup section 101 includes an X-Y address type CMOS image sensor 102 for picking up an image of an object and accumulating pixel signals, an amplification means 103 for amplifying the pixel signals in accordance with the brightness of the object, and an A/D converter 104 for converting the pixel signals into digital image data. The amplification means 103 and the A/D converter 104 constitute a conversion means 111. The image processing section 110 includes memories 105 and 107, and image processing means 106 and 108. That is, in the present embodiment, the image capturing apparatus 100 performs two types of image processing by means of the image processing means 106 and 108. The memory 105 stores digital image data outputted from the A/D converter 104. The image processing means 106 reads out the digital image data from the memory 105, performs one type of image processing, and then writes the resultant image data into the memory 107. The image processing means 108 reads out the written digital image data from the memory 107, performs the other type of image processing, and then outputs the resultant image data. Examples of the image processing performed by the image processing means 106 and 108 include various types of conventionally-known image processing, such as processing for compensating for lens distortion, processing for converting color information of Bayer arrangement into RGB, color correction based on a matrix operation of RGB signals, γ correction, and processing for compression-encoding image data. The description of the contents of these types of image processing is omitted.

Next, the major components will be described with reference to FIGS. 1 to 3. The X-Y address type CMOS image sensor 102 shown in FIG. 1 is an image sensor from which a pixel signal can be read out by specifying the address of a pixel at a desired position. FIG. 2 is a diagram for illustrating a rectangular block readout method performed when pixel signals are read out from the X-Y address type CMOS image sensor 102. In the example shown in FIG. 2, an image pickup area is divided into 3×4 rectangular blocks (0, 0), . . . , (2, 3). An area 200 is defined by adding a predetermined number of pixels to a rectangular block (0, 0) in the horizontal and vertical directions. The area 200 is a readout block unit corresponding to the rectangular block (0, 0). Pixel signals accumulated in the X-Y address type CMOS image sensor 102 are read out per such readout block corresponding to each rectangular block. Thus, for the area corresponding to the predetermined number of pixels having been added to the rectangular block, pixel signals are read out in an overlapped manner between adjacent readout blocks.

Figure 3:
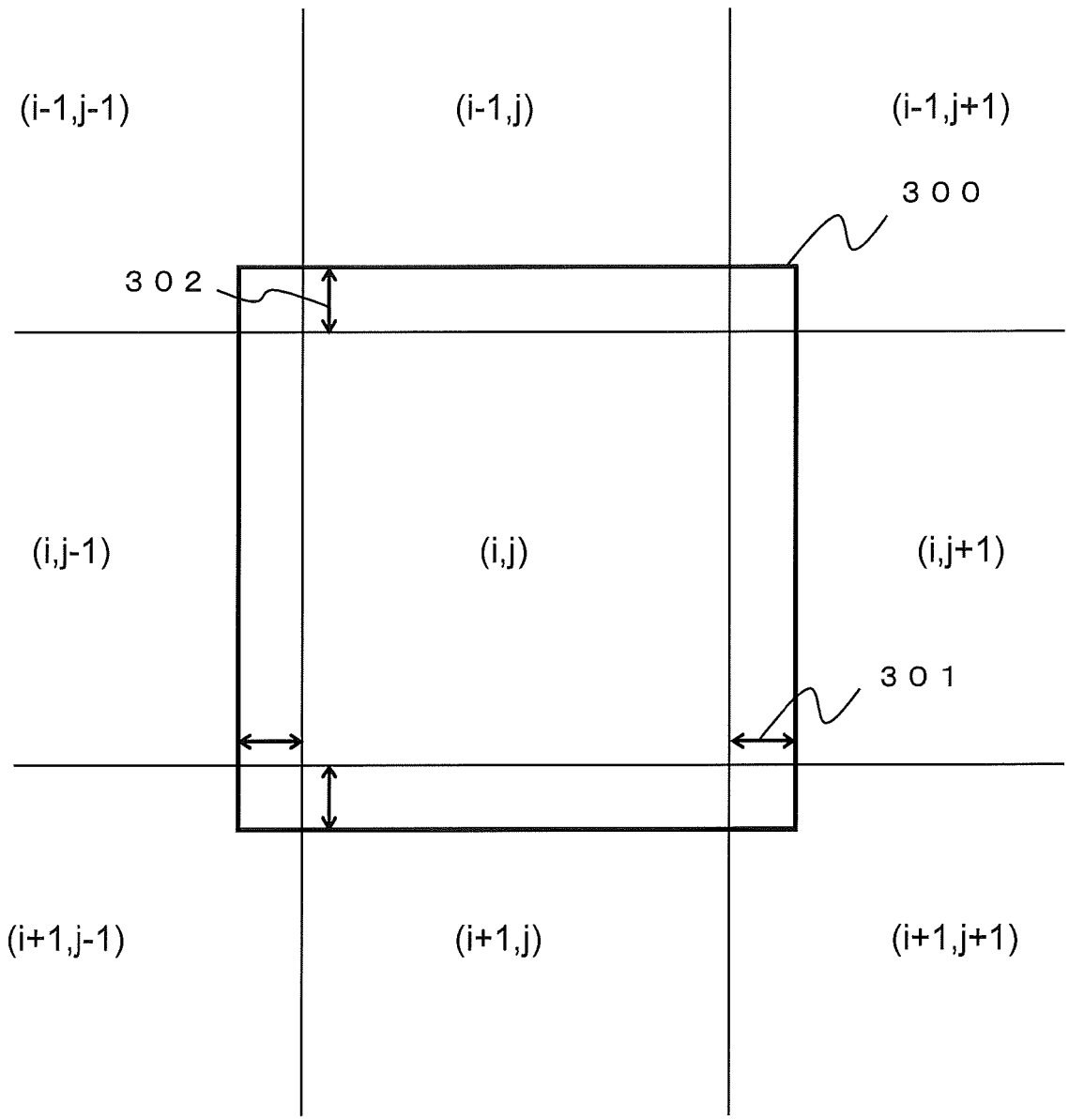
[FIG. 3]

FIG. 3 is a diagram showing a state in which a readout block corresponding to a rectangular block overlaps adjacent rectangular blocks. It suffices that an overlap amount 301 in the horizontal direction, as shown in FIG. 3, of a readout block 300 corresponding to a rectangular block (i, j) is set so that a width is secured which corresponds to the number of pixels in the horizontal direction for a filter operation that are needed for image processing which is subsequently performed for the rectangular block (i, j). Similarly, it suffices that an overlap amount 302 in the vertical direction is set so that a width is secured which corresponds to the number of pixels in the vertical direction for a filter operation that are necessary for subsequent image processing. Regarding each rectangular block at the edge of the image pickup area, as a matter of course, an overlap amount does not need to be secured in a direction in which no pixel signal exists. For example, in FIG. 2, since the rectangular block (0, 0) is located at the upper left edge of the image pickup area, the overlap amounts of the area 200 in the leftward and upward directions of the rectangular block (0, 0) are actually zero.

Figure 4:
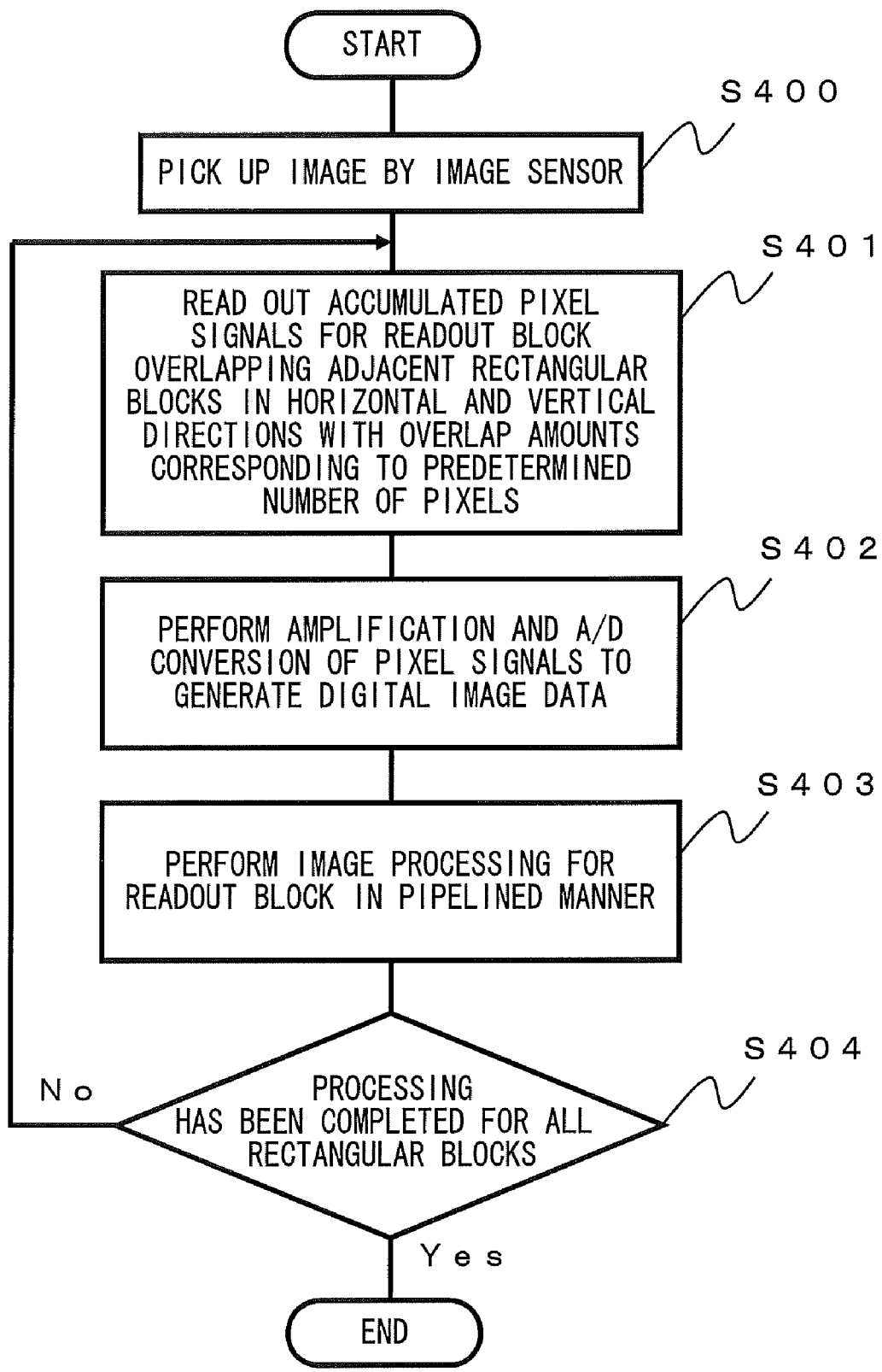
[FIG. 4]

Next, with reference to the processing flow shown in FIG. 4 of the image capturing apparatus 100 according to the present embodiment, each step of the processing flow will be described in conjunction with each component.

(Step S400) The X-Y address type CMOS image sensor 102 picks up an image of an object.

(Step S401) Pixel signals accumulated in the X-Y address type CMOS image sensor 102 as a result of the image pickup are read out per readout block which overlaps adjacent rectangular blocks in the horizontal and vertical directions with overlap amounts corresponding to a predetermined number of pixels.

(Step S402) The amplification means 103 amplifies the pixel signals, and the A/D converter 104 converts the pixel signals from analog to digital, thereby generating digital image data.

(Step S403) The image processing means 106 and 108 perform image processing per readout block in a pipelined manner.

(Step S404) If the processing has been completed for all of the rectangular blocks, the processing ends. Otherwise, the processing returns to step S401.

According to embodiment 1, when pixel signals within each rectangular block are read out, the readout is performed per readout block containing pixel signals that are necessary for image processing for the rectangular block and that are within adjacent rectangular blocks. Thus, image processing can be performed for the rectangular block using only the image data in the readout block. Therefore, unlike conventional techniques, it is unnecessary to hold the data of a plurality of rectangular blocks on a memory at the same time or to expand image data required for image processing on a memory every time the image processing is performed. This can result in reduction in memory capacity and the amount of data access, thereby realizing cost reduction. In addition, pipeline processing can be more easily realized.

In the present embodiment, the two image processing means 106 and 108 are connected to each other via the memory 107, and two types of image processing are performed in a pipelined manner. However, the numbers of image processing means and memories may be increased or decreased depending on the number of types of image processing, and the number of stages in the pipeline processing may be changed. When the number of types of image processing increases, the number of memories increases. However, each of the memories may be a small sized one having a capacity sufficient for one readout block. In addition, since memory accesses for reading and writing data are distributed among the memories, the access bandwidth of each memory may be small. Therefore, increase in cost can be suppressed as compared to that in conventional techniques.

(Embodiment 2)

Figure 5:
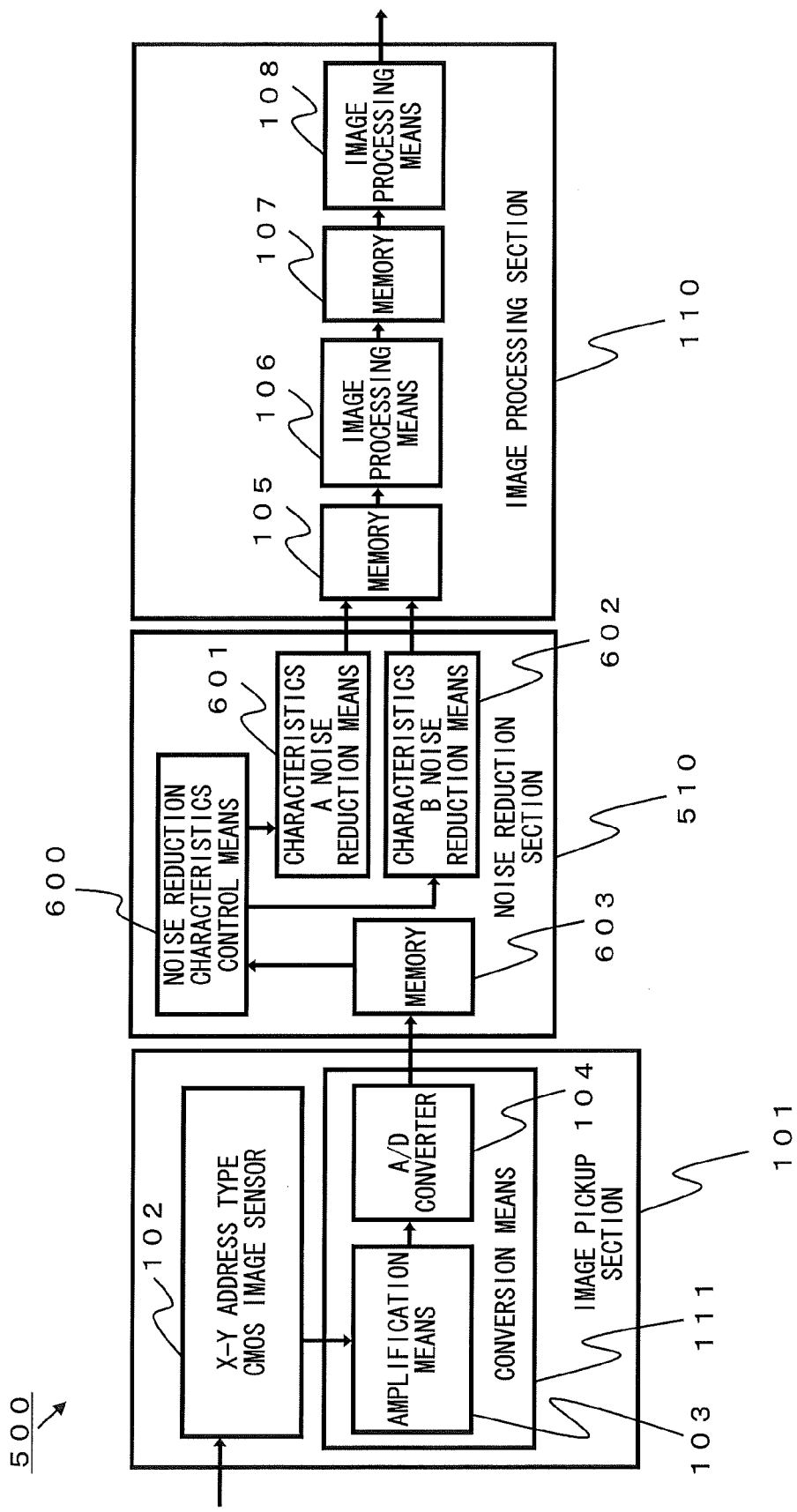
[FIG. 5]

FIG. 5 is a diagram showing an image capturing apparatus 500 according to embodiment 2 of the present invention. The image capturing apparatus 500 includes a noise reduction section 510 between the A/D converter 104 and the memory 105 of the image capturing apparatus 100 according to embodiment 1. The image capturing apparatus 500 performs noise reduction processing before digital image data outputted from the A/D converter 104 is written into the memory 105. The same components as those of embodiment 1 are denoted by the same reference characters, and the description thereof is omitted. The noise reduction section 510 performs different types of noise reduction processing having different characteristics, one type of which is performed for an area that is contained in a readout block and that overlaps another readout block for which readout has been previously performed, and another type of which is performed for an area that is contained in the readout block and that does not overlap any other readout blocks for which readout has been previously performed. That is, the noise reduction section 510 performs different types of noise reduction processing having different characteristics, one type of which is performed on image data corresponding to pixel signals that have been read out from the X-Y address type CMOS image sensor 102 for the first time after image pickup, and another type of which is performed on image data corresponding to pixel signals other than the above pixel signals. The reason why the mode of noise reduction is switched as described above will be described later.

The internal configuration of the noise reduction section 510 will be described. A noise reduction characteristics control means 600 performs switching between a characteristics A noise reduction means 601 and a characteristics B noise reduction means 602. The characteristics A noise reduction means 601 is a noise reduction means suitable for reducing random pattern noises, such as dark current noise, photon shot noise, and kTC noise. The characteristics B noise reduction means 602 is a noise reduction means suitable for reducing random pattern noises, such as dark current noise and photon shot noise. The dark current noise, photon shot noise, and kTC noise are known to occur generally in a CMOS image sensor. The description of the dark current noise and photon shot noise is omitted. The description of the kTC noise will be given later together with the description of the reason why the mode of noise reduction is switched.

Figure 6:
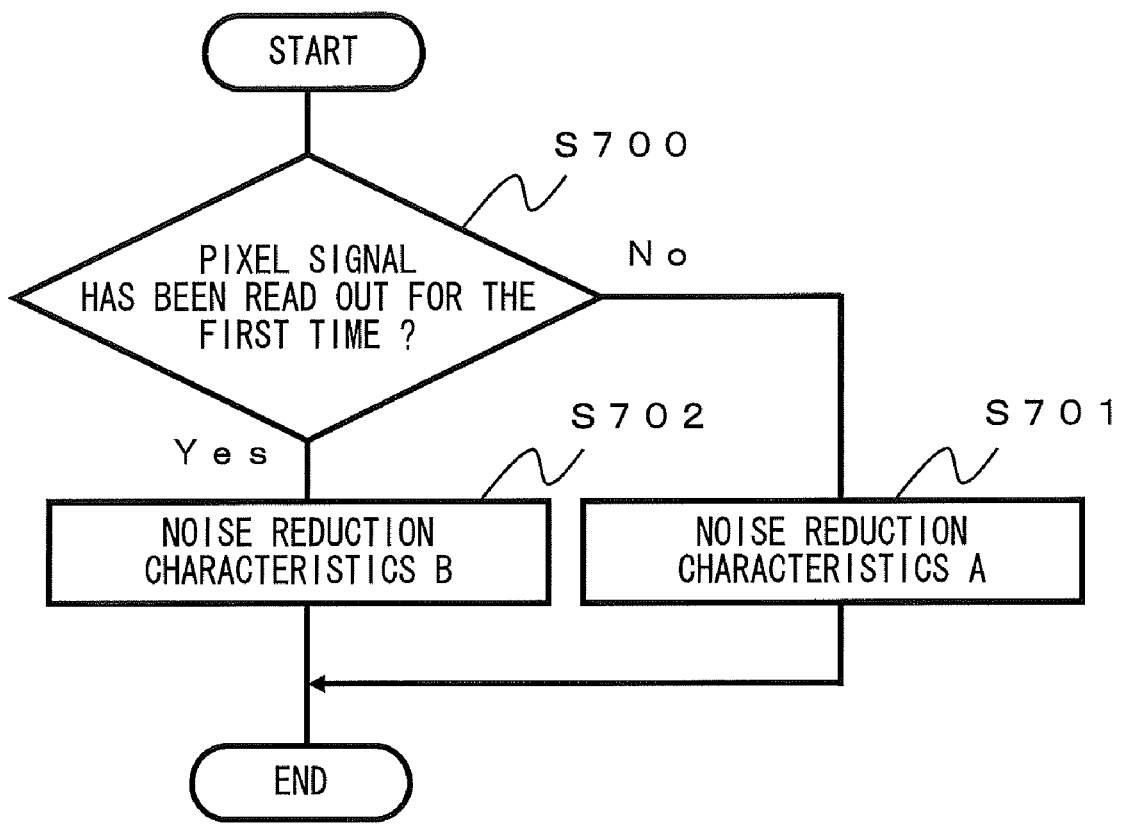
[FIG. 6]
Figure 7:
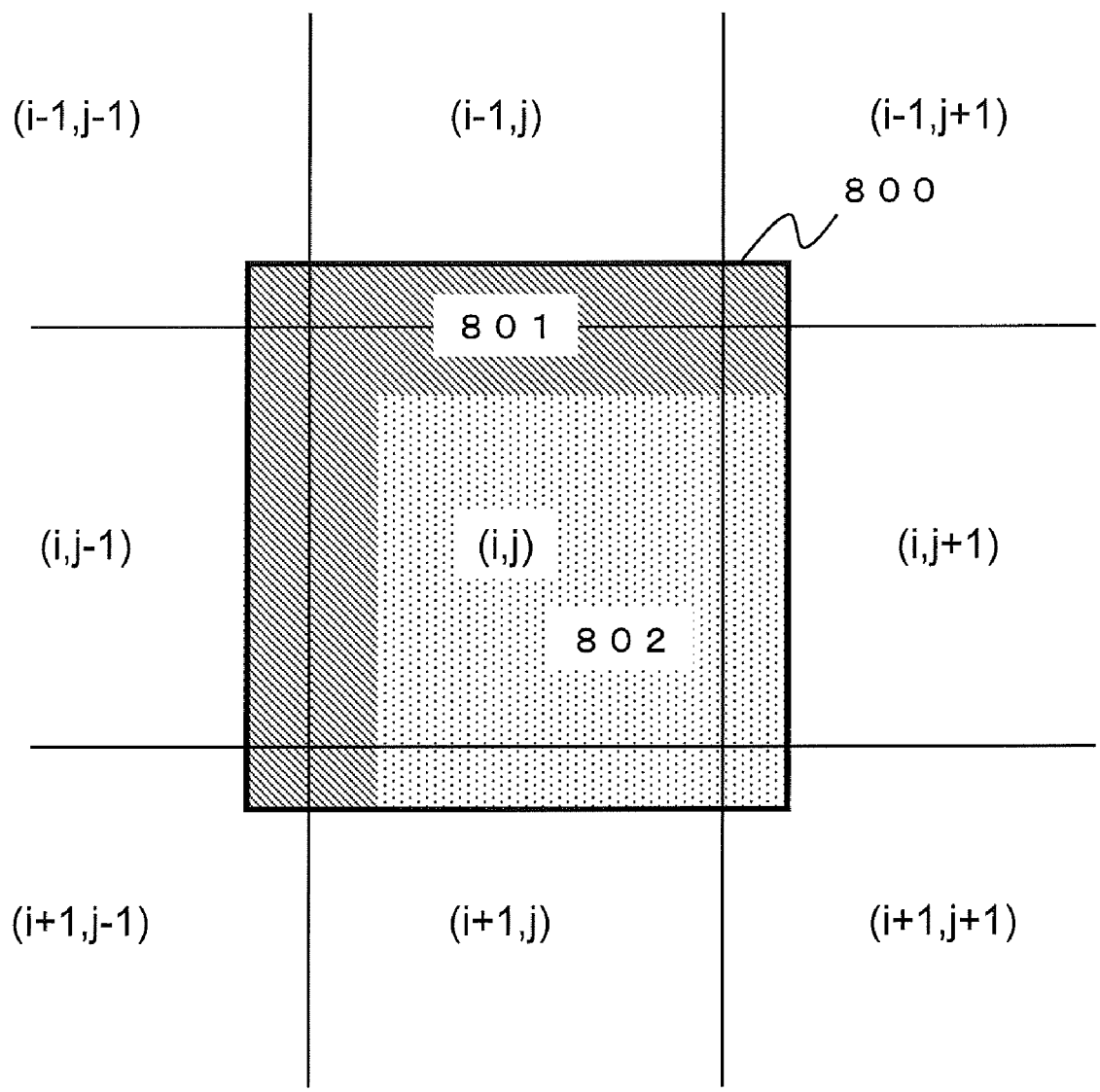
[FIG. 7]

With reference to the processing flow shown in FIG. 6 of the noise reduction characteristics control means 600 and an example shown in FIG. 7 for illustrating the switching of the characteristics of noise removal, each step of the processing flow will be described. The noise reduction characteristics control means 600 performs the following steps, targeting each pixel data contained in image data being currently processed.

(Step S700) The noise reduction characteristics control means 600 determines whether or not target pixel data is pixel data corresponding to a pixel signal that has been read out from the X-Y address type CMOS image sensor 102 for the first time.

(Step S701) If the target pixel data is not pixel data corresponding to a pixel signal that has been read out for the first time, the target pixel data is processed by the characteristics A noise reduction means 601.

(Step S702) If the target pixel data is pixel data corresponding to a pixel signal that has been read out for the first time, the target pixel data is processed by the characteristics B noise reduction means 602.

In order to determine whether or not a pixel signal corresponding to target pixel data has been read out for the first time, the noise reduction characteristics control means 600 may store the range of pixel signals that have been previously read out, on the basis of the range of the addresses of the pixel signals or on the basis of readout blocks, and determine whether the pixel signal corresponding to the target pixel data is contained within the range.

For example, consideration will be given to an area 800 shown in FIG. 7 of a readout block corresponding to a rectangular block (i, j). At the point of time when readout is performed for the readout block corresponding to the rectangular block (i, j), pixel data contained in an area 801 indicated by diagonal lines is contained also in readout blocks which correspond to rectangular blocks (i−1, j−1), (i, j−1), and (i−1, j), respectively, and for which readout has been previously performed. Therefore, the pixel data contained in the area 801 is not pixel data corresponding to pixel signals that have been read out for the first time. Thus, the noise reduction processing of noise reduction characteristics A is performed for the area 801. On the other hand, readout blocks, which correspond to rectangular blocks (i+1, j), (i, j+1), and (i+1, j+1), respectively, have not been subjected to readout yet. Therefore, pixel data contained in an area 802 is pixel data corresponding to pixel signals that have been read out for the first time at this point of time. Thus, the noise reduction processing of noise reduction characteristics B is performed for the area 802.

Figure 8:
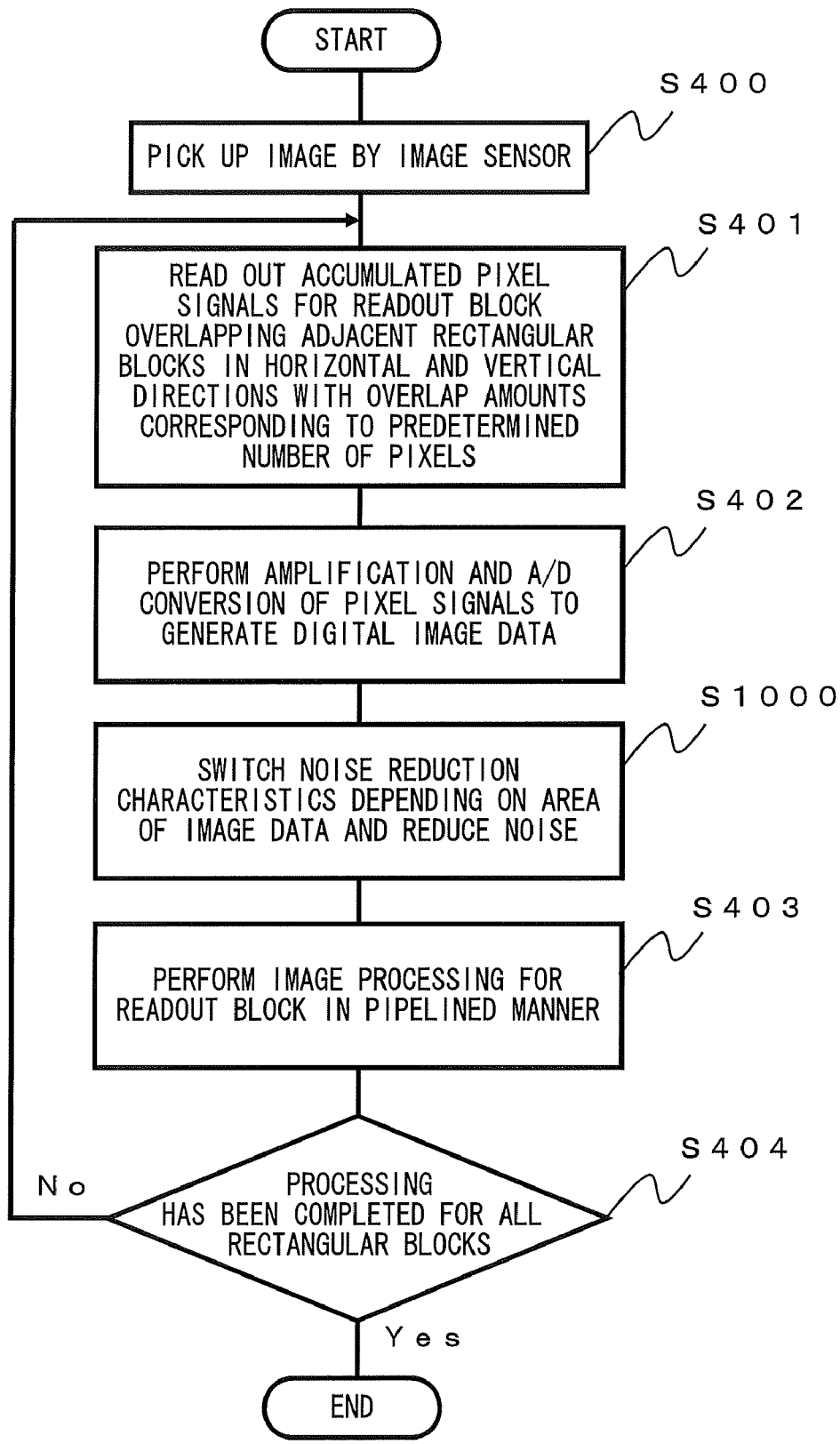
[FIG. 8]

Next, with reference to the entire processing flow shown in FIG. 8 of the image capturing apparatus 500 according to the present embodiment, each step of the processing flow will be described in conjunction with each component. The processing flow further includes step S1000 between step S402 and step S403 of embodiment 1. In FIG. 8, the same steps as those of embodiment 1 are denoted by the same reference characters, and the description thereof is omitted.

(Step S1000) By performing the processing of steps S700 to S702 described above, the noise reduction section 510 switches noise reduction characteristics and reduces noise.

Hereinafter, a description will be given of the reason why the different types of noise reduction processing having different characteristics are performed, one type of which is performed on image data corresponding to pixel signals that have been read out from the X-Y address type CMOS image sensor 102 for the first time after image pickup, and another type of which is performed on image data corresponding to pixel signals other than the above pixel signals. FIG. 9 is a diagram showing the configuration of a pixel unit of a general CMOS image sensor. Each pixel of the CMOS image sensor includes a PD (photodiode) for receiving light and accumulating an electric charge, an FD (floating diffusion) for converting into a voltage the electric charge having been read out, and TRs (transistors) for performing the functions of reset, amplification, and selection, respectively. Such a pixel unit is controlled by means of a readout signal line, selection signal line, and reset signal line, and outputs a pixel signal to an output signal line.

In general, the electric potential of the FD is reset before the electric charge that the PD accumulates by receiving light is read out. At this time, according to Non Patent Literature 1, random pattern noise called kTC noise occurs in the electric potential of the FD. Thereafter, the electric charge is read out by the FD, and the electric potential of the FD is changed depending on the electric charge. A pixel signal to be read out by the outside is an electric potential signal having been amplified in accordance with the change of the electric potential of the FD, and the electric potential of the FD when the pixel signal is read out additionally contains the kTC noise having occurred at the time of the reset. Thus, if the electric potential of the FD at the time of the reset is sampled, held, and subtracted from the electric potential of the pixel signal having been read out, the kTC noise can be canceled. As a circuit that performs such sampling and noise cancellation, a CDS (Correlated Double Sampling) circuit is known.

However, when the pixel signal is read out for the second and subsequent times, the electric potential of the FD is different from that at the time of the reset, and cannot be reset again, and therefore the kTC noise cannot be canceled by the above-described method. Consequently, the pixel signal that has been read out for the second time contains the kTC noise. According to the present embodiment, noise reduction processing is performed on image data corresponding to such a pixel signal with a method particularly suitable for reducing kTC noise.

According to embodiment 2, similar to embodiment 1, memory capacity and the amount of data access can be reduced, cost reduction can be realized, and it is also made easier to realize pipeline processing. In addition, it is possible to reduce kTC noise which is inevitably contained in pixel data due to pixel signals being read out multiple times, whereby degradation in image quality can be prevented.

Figure 10:
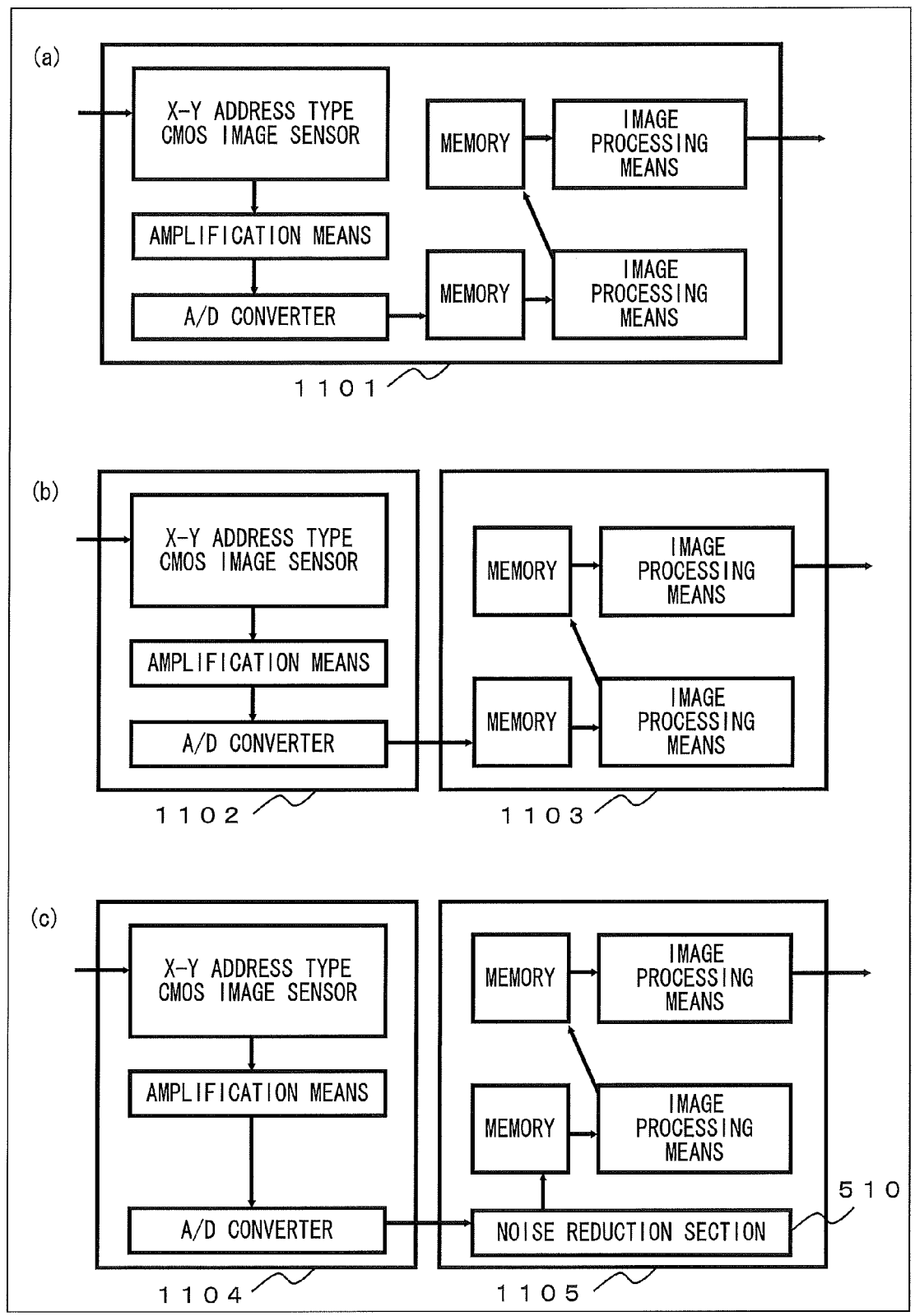
[FIG. 10]
Figure 12:
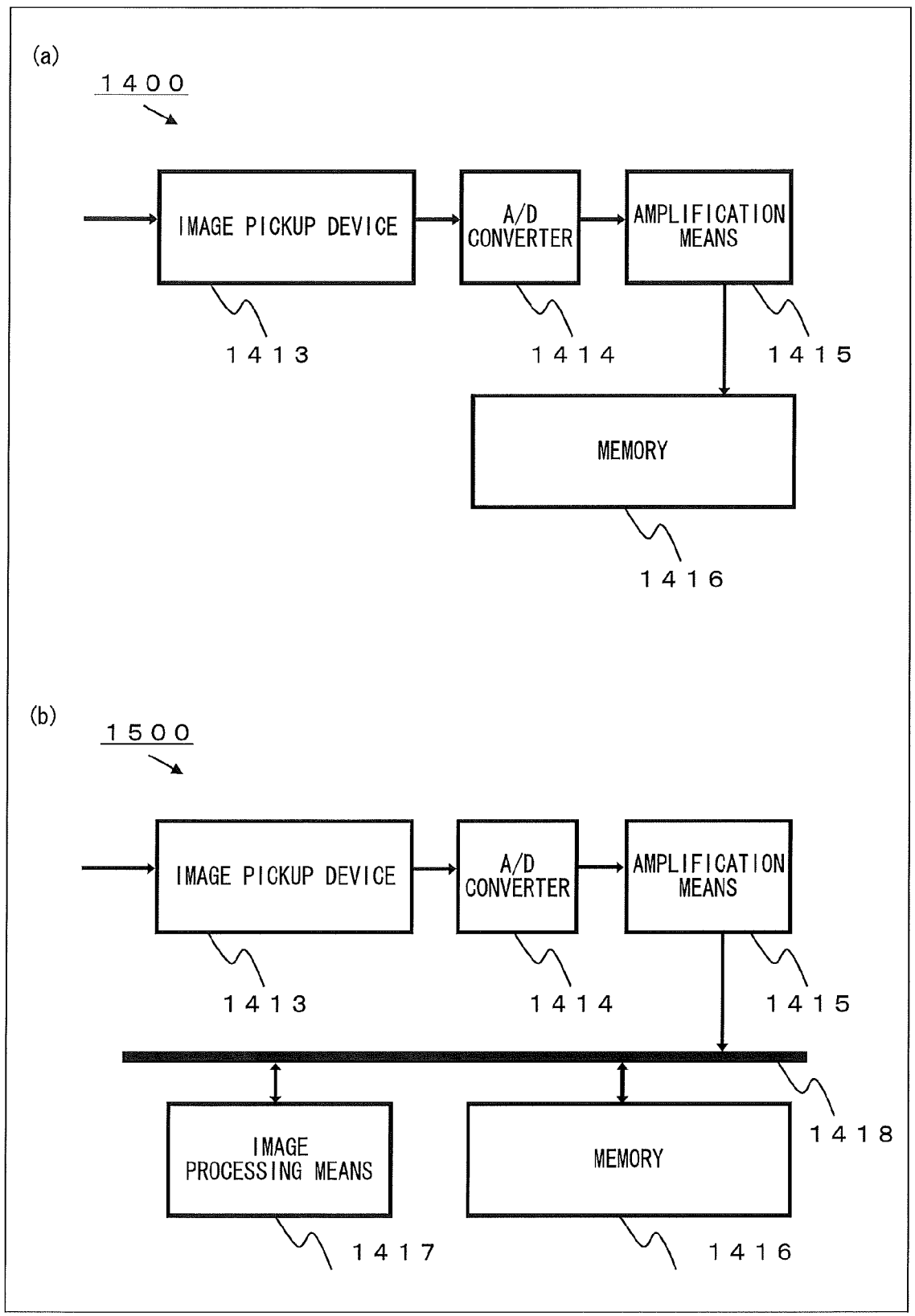
[FIG. 12] (a) of FIG. 12 is a diagram showing the configuration of a conventional image capturing apparatus, and (b) of FIG. 12 is a diagram for illustrating a problem of a conventional image capturing apparatus.
Figure 13:
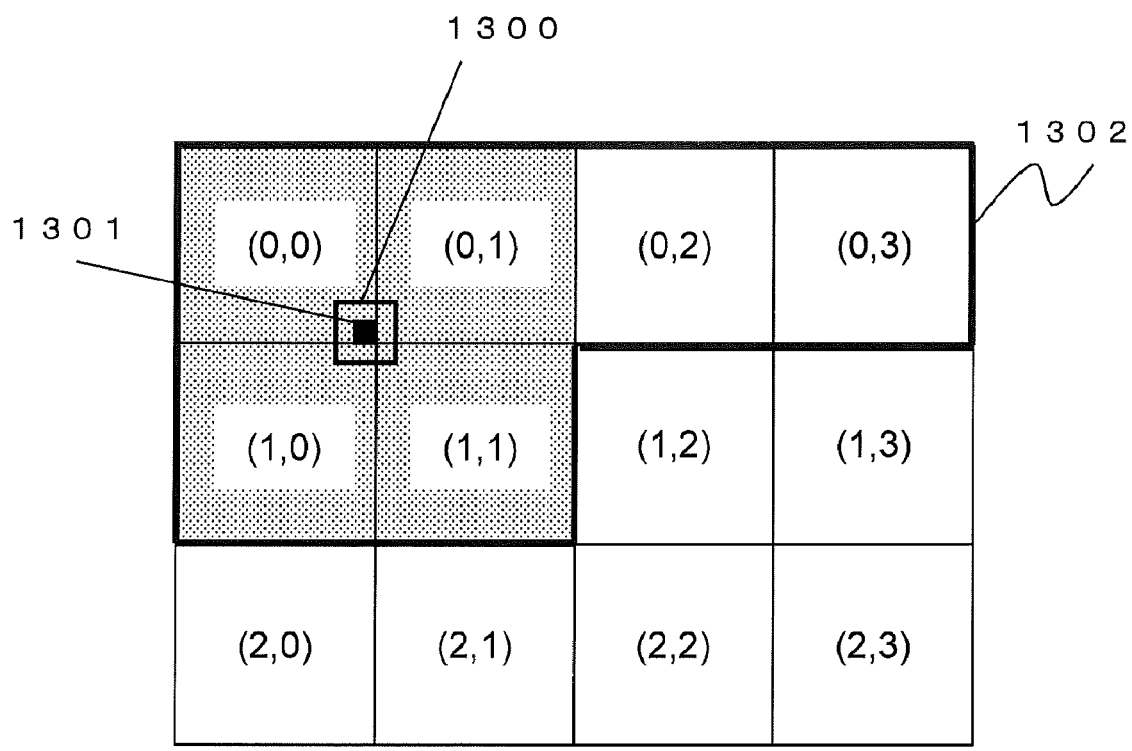
[FIG. 13]

The image capturing apparatus of the present invention, which has been described above, can be implemented as an integrated circuit. As shown in (a) of FIG. 10, the integrated circuit may be implemented as an integrated circuit 1101 with a one-chip configuration. Alternatively, as shown in (b) of FIG. 10, the integrated circuit may be implemented with a two-chip configuration in which the function of the image pickup section and the function of the image processing section are integrated on different integrated circuits 1102 and 1103, respectively. On such an integrated circuit, the function of the noise reduction section 510 described in embodiment 2 may be integrated as shown in (c) of FIG. 10. Although (c) of FIG. 10 shows an example in which the noise reduction section 510 is included in an integrated circuit 1105 for performing image processing, the noise reduction section 510 may be included in an integrated circuit 1104 for performing image pickup. In addition, although (a), (b), and (c) of FIG. 10 show examples in which two memories and image processing means are included, the numbers of memories and image processing means can be increased or decreased as necessary. In such an integrated circuit, an external memory such as a DRAM can be excluded by installing, in the integrated circuit, a memory having a minimum capacity which is small. Accordingly, cost and power consumption can be further reduced. The image capturing apparatus of the present invention may also be implemented with three or more integrated circuit chips.

In addition, the image capturing apparatus of the present invention may be included in a digital camera system. FIG. 11 is a diagram showing an example of the configuration of a digital camera system including the image capturing apparatus. The digital camera system includes: an image pickup peripheral section which is an input interface for images; a microphone which is an input interface for sounds; an autofocus section; a camera signal processing means for controlling the autofocus section; an AV signal processing means which includes a video image encoder, a video image decoder, a sound encoder, and a sound decoder for encoding and decoding video images and sounds, respectively; a display section for displaying images; an image/sound interface which is an interface for outputting images and sounds; and a recording interface for inputting/outputting recorded data; and a system control means for controlling all of the components. In this example, the image pickup section is mounted in the image pickup peripheral section, and the image processing means is mounted in the camera signal processing means.

Industrial Applicability

The image capturing apparatus according to the present invention is useful for digital camera systems and the like, and is particularly useful in reducing cost by reducing memory and power consumption in digital camera systems which have a large number of pixels and provide a high image quality.

Description of the Reference Characters 100, 500 image capturing apparatus
101 image pickup section
102 X-Y address type CMOS image sensor
103 amplification means
104 A/D converter
105, 107, 603 memory
106, 108 image processing means
110 image processing section
111 conversion means
200, 300, 800 image data readout area
301 overlap amount in the horizontal direction
302 overlap amount in the vertical direction
510 noise reduction section
600 noise reduction characteristics control means
601 characteristics A noise reduction means
602 characteristics B noise reduction means
801 area having been subjected to readout for the second and subsequent times
802 area having been subjected to readout for the first time
1101, 1102, 1103, 1104, 1105 integrated circuit
1300 3×3 filter area
1301 center of 3×3 filter area
1302 area required to be stored in memory in conventional technique
1413 image pickup device
1414 A/D converter
1415 amplification means
1416 memory
1417 image processing means
1418 bus
1400 conventional image processing apparatus
1500 conventional image processing apparatus including image processing means

The invention claimed is:

1. An image capturing apparatus for picking up an image of an object and outputting image data of the object, the image capturing apparatus comprising:
an image pickup section including:
an X-Y addressable image sensor for picking up an image of an object and accumulating, in an image pickup area thereof, pixel signals of the object obtained by the image pickup; and
a conversion means for sequentially reading out pixel signals contained in each of processing units, converting the pixel signals into image data, and outputting the image data, the processing units each being an area of a predetermined size defined by dividing the image pickup area of the image sensor into rectangular blocks of a predetermined size and adding a predetermined number of pixels to each rectangular block in vertical and horizontal directions of the rectangular block;
a noise reduction section for sequentially receiving the image data outputted from the image pickup section, performing different types of noise reduction processing having different characteristics, and outputting the resultant image data, one type of which noise reduction processing is performed on a part of the image data corresponding to pixel signals that have been read out for the first time after image pickup by the image sensor, and another type of which is performed on a part of the image data corresponding to pixel signals that have been read out for the second and subsequent times after image pickup by the image sensor; and
an image processing section including one or more memories and one or more image processing means each of which performs predetermined image processing, the one or more memories and the one or more image processing means being alternately connected to each other, the image processing section being for sequentially receiving the image data having been subjected to the noise reduction processing and outputted from the noise reduction section, sequentially performing one or more types of the predetermined image processing on the image data that is contained in the range of the rectangular block, and outputting the resultant image data.

2. The image capturing apparatus according to claim 1, wherein at least one of the functions of the image pickup section, the noise reduction section, and the image processing section is integrated on an integrated circuit.

3. A digital camera system comprising:
an image pickup peripheral section which is an input interface for images;
a microphone which is an input interface for sounds;
an autofocus section;
a camera signal processing means for controlling the autofocus section;
an AV signal processing means for encoding and decoding video images, and encoding and decoding sounds;
an image/sound interface for outputting images and sounds;
a recording interface for inputting/outputting recorded data; and
an image capturing apparatus according to claim 1.

4. An integrated circuit having integrated functions of an image capturing apparatus for picking up an image of an object and outputting image data of the object, the integrated circuit comprising:
an image pickup section including:
an X-Y addressable image sensor for picking up an image of an object and accumulating, in an image pickup area thereof, pixel signals of the object obtained by the image pickup; and
a conversion means for sequentially reading out pixel signals contained in each of processing units, converting the pixel signals into image data, and outputting the image data, the processing units each being an area of a predetermined size defined by dividing the image pickup area of the image sensor into rectangular blocks of a predetermined size and adding a predetermined number of pixels to each rectangular block in vertical and horizontal directions of the rectangular block;
a noise reduction section for sequentially receiving the image data outputted from the image pickup section, performing different types of noise reduction processing having different characteristics, and outputting the resultant image data, one type of which noise reduction processing is performed on a part of the image data corresponding to pixel signals that have been read out for the first time after image pickup by the image sensor, and another type of which is performed on a part of the image data corresponding to pixel signals that have been read out for the second and subsequent times after image pickup by the image sensor; and
at least one image processing section including one or more memories and one or more image processing means each of which performs predetermined image processing, the one or more memories and the one or more image processing means being alternately connected to each other, the image processing section being for sequentially receiving the image data having been subjected to the noise reduction processing and outputted from the noise reduction section, sequentially performing one or more types of the predetermined image processing on the image data that is contained in the range of the rectangular block, and outputting the resultant image data.

5. An image capturing method for picking up an image of an object and outputting image data of the object, the image capturing method comprising the steps of:
picking up an image of an object by means of an X-Y addressable image sensor and accumulating pixel signals obtained by the image pickup in an image pickup area of the image sensor;
sequentially reading out pixel signals contained in each of processing units and converting the pixel signals into image data, the processing units each being an area of a predetermined size defined by dividing the image pickup area of the image sensor into rectangular blocks of a predetermined size and adding a predetermined number of pixels to each rectangular block in vertical and horizontal directions of the rectangular block;
sequentially receiving the image data and performing different types of noise reduction processing having different characteristics, one type of which noise reduction processing is performed on a part of the image data corresponding to pixel signals that have been read out for the first time after image pickup by the image sensor, and another type of which is performed on a part of the image data corresponding to pixel signals that have been read out for the second and subsequent times after image pickup by the image sensor; and
by alternately executing one or more substeps of receiving and storing the image data and one or more substeps each of which performs predetermined image processing, sequentially receiving the image data having been subjected to the noise reduction processing, sequentially performing one or more types of the predetermined image processing on the image data that is contained in the range of the rectangular block, and outputting the resultant image data.

* * * * *